United States Patent
Terry et al.

(10) Patent No.: US 8,725,905 B2
(45) Date of Patent: May 13, 2014

(54) POWER OVER ETHERNET POWERED MANAGEMENT AND DIAGNOSES OF INFORMATION HANDLING SYSTEMS

(75) Inventors: Jared Terry, Austin, TX (US); Samit Ashdhir, Round Rock, TX (US); Dhiraj Sehgal, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 832 days.

(21) Appl. No.: 11/329,856

(22) Filed: Jan. 11, 2006

(65) Prior Publication Data

US 2007/0162620 A1    Jul. 12, 2007

(51) Int. Cl.
- G06F 15/16    (2006.01)
- H04L 29/14    (2006.01)
- H04L 29/08    (2006.01)

(52) U.S. Cl.
CPC ............... *H04L 69/40* (2013.01); *H04L 67/10* (2013.01); *H04L 67/1034* (2013.01)
USPC ............. 709/253; 709/223; 370/389; 714/4.1

(58) Field of Classification Search
CPC .......................................... H04L 69/40
USPC ........................................ 709/253; 713/300
See application file for complete search history.

(56) References Cited

U.S. PATENT DOCUMENTS

| | | | |
|---|---|---|---|
| 5,944,831 A * | 8/1999 | Pate et al. ..................... 713/324 |
| 6,105,138 A * | 8/2000 | Arakawa et al. ............. 713/300 |
| 6,363,449 B1 * | 3/2002 | Sides et al. .................... 710/100 |
| 6,496,103 B1 * | 12/2002 | Weiss et al. .................... 375/257 |
| 6,502,203 B2 * | 12/2002 | Barron et al. .................. 714/4.5 |
| 6,535,983 B1 * | 3/2003 | McCormack et al. ........ 713/310 |
| 6,643,269 B1 * | 11/2003 | Fan et al. ...................... 370/254 |
| 6,643,566 B1 * | 11/2003 | Lehr et al. ..................... 700/286 |
| 6,764,343 B2 * | 7/2004 | Ferentz .................... 439/620.01 |
| 6,880,095 B2 * | 4/2005 | Cromer et al. ................ 713/300 |
| 7,046,929 B1 * | 5/2006 | Hester et al. .................... 398/17 |
| 7,082,372 B2 * | 7/2006 | Rakshani et al. ............... 702/60 |
| 7,221,261 B1 * | 5/2007 | Klingensmith et al. . 340/310.11 |
| 7,254,734 B2 * | 8/2007 | Lehr et al. ..................... 713/340 |
| 7,340,325 B2 * | 3/2008 | Sousa et al. ................... 700/295 |
| 7,343,506 B1 * | 3/2008 | Fenwick ........................ 713/340 |
| 7,353,407 B2 * | 4/2008 | Diab et al. ..................... 713/300 |

(Continued)

FOREIGN PATENT DOCUMENTS

EP    1545050 A2 *    6/2005    ............. H04L 12/10

OTHER PUBLICATIONS

Conover, J.,"You've got the Power over Ethernet", Network Computing, {Netw-Comput-USA}, Apr. 29, 2004, vol. 15, No. 8, p. 71-4.*

(Continued)

*Primary Examiner* — Andrew Goldberg
(74) *Attorney, Agent, or Firm* — Baker Botts L.L.P.

(57) ABSTRACT

A power over Ethernet (PoE) compliant device may be able to keep alive just enough of a management controller and/or target to respond to requests and tell a host (initiator) why it may be unable to respond to a data transfer request in a desired fashion due to a power failure. Thus only a small portion of an information handling system management capabilities need stay alive for reporting the operational condition of the overall information handling system during a power outage.

25 Claims, 4 Drawing Sheets

(56) References Cited

U.S. PATENT DOCUMENTS

| | | | |
|---|---|---|---|
| 7,424,348 B2* | 9/2008 | Claseman | 701/1 |
| 7,457,262 B1* | 11/2008 | Doshi et al. | 370/328 |
| 7,478,251 B1* | 1/2009 | Diab et al. | 713/300 |
| 7,500,121 B2* | 3/2009 | Langer | 713/310 |
| 2003/0099076 A1* | 5/2003 | Elkayam et al. | 361/90 |
| 2003/0154281 A1* | 8/2003 | Mitsuoka et al. | 709/225 |
| 2003/0233583 A1* | 12/2003 | Carley | 713/201 |
| 2004/0142733 A1* | 7/2004 | Parise | 455/572 |
| 2004/0209617 A1* | 10/2004 | Hrastar | 455/434 |
| 2004/0230846 A1* | 11/2004 | Mancey et al. | 713/300 |
| 2004/0268078 A1* | 12/2004 | Hassan | 711/170 |
| 2005/0003795 A1* | 1/2005 | Lehr et al. | 455/402 |
| 2005/0044431 A1* | 2/2005 | Lang et al. | 713/300 |
| 2005/0097369 A1* | 5/2005 | Bowser et al. | 713/300 |
| 2005/0229016 A1* | 10/2005 | Addy | 713/300 |
| 2005/0243861 A1* | 11/2005 | Elkayam et al. | 370/466 |
| 2005/0255894 A1* | 11/2005 | Heller | 455/572 |
| 2006/0036786 A1* | 2/2006 | Kreiner et al. | 710/62 |
| 2006/0047800 A1* | 3/2006 | Caveney et al. | 709/223 |
| 2006/0080504 A1* | 4/2006 | Kreiner et al. | 711/114 |
| 2006/0080573 A1* | 4/2006 | Biederman et al. | 714/11 |
| 2006/0109728 A1* | 5/2006 | Dwelley et al. | 365/222 |
| 2006/0133368 A1* | 6/2006 | Tolliver | 370/389 |
| 2006/0263925 A1* | 11/2006 | Chandler | 438/61 |
| 2007/0019560 A1 | 1/2007 | Brewer et al. | |
| 2007/0025274 A1* | 2/2007 | Rahman et al. | 370/254 |
| 2007/0079151 A1* | 4/2007 | Connor et al. | 713/300 |
| 2010/0128732 A1* | 5/2010 | Jiang | 370/400 |

OTHER PUBLICATIONS

Patoka, M., "Power over Ethernet eases design implementations", Power Electronics Technology, {Power-Electron-Technol-USA}, Nov. 2003, vol. 29, No. 11, p. 34, 38, 40-1.*

Lecklider-T., "LAN wiring does double duty", Evaluation Engineering, {EE-Eval-Eng-USA}, Nov. 2004, vol. 43, No. 11, p. 46, 48-50.*

Brett Lane, Jack Tison, "Power Over the Ethernet", Wire & Cable Technology, Nov. 2005, p. 26 & 29.*

Marsh-D., "Power and wireless options extend Ethernet's reach.", EDN (US Edition), Nov. 11, 2004, vol. 49, No. 23, p. 67-80, Publisher: Cahners Publishing, USA.*

Berson-Y., "High-power PoE technology evolves.", Power Electronics Technology, {Power-Electron-Technol-USA}, Jun. 2004, vol. 30, No. 6, p. 52-4, Publisher: Intertec Publishing, USA.*

Geier, Even Fewer Wires: Power-over-Ethernet (PoE), Jul. 15, 2002, available at http://www.wi-fiplanet.com/tutorials/article.php/1404631.

Nortel Networks, Dynamic Resource Allocation Controller, 2004, available at http://www.nortel.com/solutions/optical/collateral/nn110181.pdf.

Dell Inc., Dell EMC Storage Products, 2005, available at https://strobe.uwaterloo.ca/~twiki/pub/ISTCSS/BladeDell/dlemc_broch.pdf.

Gordon, A Beginners guide to iSCSI, Search Storage, Jun. 23, 2003, available at http://searchstorage.techtarget.com/tip/0,289483,sid5_gci904505,00.html.

* cited by examiner

POWER OVER ETHERNET POWERED MANAGEMENT AND DIAGNOSES OF INFORMATION HANDLING SYSTEMS

TECHNICAL FIELD

The present disclosure relates generally to information handling systems and, more particularly, to using power-over Ethernet (PoE) compatible components for management and diagnoses of information handling systems, e.g., server/storage platforms.

BACKGROUND

As the value and use of information continues to increase, individuals and businesses seek additional ways to process and store information. One option available to users are information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, RAID disk system and telecommunications switch.

Information handling systems are becoming more and more important in both business and personal life. Important and critical information handling systems may be remote and/or unattended such as for example, but not limited to, servers and/or storage devices. Therefore, power failures/outages may be catastrophic to the operation of these servers and/or storage devices, leaving them unable to service user requests. For example, an iSCSI (Internet Small Computer System Interface) may be used to facilitate data transfers over intranets, e.g., local area networks (LANs) and/or to manage storage over long distances, e.g., wide area networks (WANs) and the Internet, thereby enabling location-independent data storage and retrieval.

The remote and/or unattended information handling systems that use, for example, iSCSI protocol would have no way of responding to a request if power was interrupted. Such a power interruption may leave iSCSI initiators and/or management applications with little information about the state of a target system except that it can no longer communicate with the initiator. Presently, information handling system servers and/or storage devices may use "flea power" to keep appropriate controllers and/or communications devices, e.g., network interface card (NIC), operational during hibernate or sleep modes, however, if there is a complete loss of utility (AC mains) power, even the flea power may no longer be available to power critical controllers and/or communications devices.

Power failures/outages may be catastrophic to information handling systems, e.g., servers and/or storage devices, especially when remote from the user's location and/or unattended, by rendering them unable to service any user requests and/or maintain data integrity. Information handling systems may use supplemental power sources, e.g., battery back-up systems, to provide temporary for the management and storage controllers under power failure conditions. The battery back-up systems may have limited life and add to the space required for the information handling system.

There may be a number of interface cards that during normal operation may be in critical stages when a power outage happens. Battery back-up systems may not be reliable and the batteries may malfunction or indicate false failure reports. Information handling system critical interfaces continue to increase their power requirements and may stretch battery back-up systems to their mechanical and electrical limits.

SUMMARY

Power over Ethernet (PoE) compliant controllers and/or communication devices do not lose their ability to operate and/or communicate with other PoE devices even if the information handling system loses AC mains power and/or power from an uninterruptible power supply (UPS). For example, a PoE powered device (PD) compliant with IEEE 802.3af, incorporated by reference herein for all purposes, e.g., network interface controller (NIC), may be particularly useful in applications such as an iSCSI storage system and/or a remote access controller (RAC).

For example, an iSCSI interface may stay alive even though power as been lost to its main information handling system. This stay alive ability of the PoE compliant iSCSI device may enable an iSCSI target to provide information (respond to an iSCSI initiator request) as to why it cannot fully respond to an initiator data access and/or storage request. This response capability may enable the requesting iSCSI initiator to perform a graceful disconnect instead of just assuming a lost connection/communication. Another example in a remote access controller compliant system is remote control of the system may still be possible even if a catastrophic AC power failure has occurred at the remote access controller compliant system. Thus, an administrator may still be able to remotely check on the remote access controller compliant system even with the AC power off.

In addition, out of band management may remain functional even if there has been AC power failure. The may allow management applications to report more specific information then just a lost connection/communication.

For a general server, a PoE compliant NIC and NIC driver in a remote server may be setup to detect whether or not the server system shutdown gracefully and respond as such to management applications such as HP OPENVIEW (a registered trademark of Hewlett-Packard Company) or IT Assistant. The PoE compliant NIC may also be able to send an alert (e.g., not a poll but rather an interrupt event) to the management application that may then be acted upon by the management application, e.g., page a system administrator.

Using PoE compliant interface devices in the information handling systems may go along way in solving the inherent problems with battery back-up. However, power management of the PoE compliant devices takes on added importance as more PoE compliant devices are deployed with the information handling systems, e.g., NICs on local area networks (LAN), because it becomes more important to have some intelligent power management and distribution system that may optimally utilize the supplemental power source (e.g., PoE). An intelligent power management and distribution system may be able to manage multiple PoE compliant powered devices from a PoE source. When needed, diverting power from one PoE compliant device to another may more effectively utilize the limited PoE source.

In a multi-PoE compliant device environment, PoE power allocation may be managed by either: a) Dynamic Power Allocation—based on each PoE compliant device power utilization, the PoE Power Manager performs continuous power monitoring of the power consumption by each PoE compliant device; or b) Static Power Allocation—where each PoE compliant device requests arbitrary power (similar to an IEEE 802.3af request) or the PoE Power Manager allocates arbitrary power to each of the PoE compliant devices.

According to a specific example embodiment of this disclosure, an information handing system comprises a method for performing management and diagnoses of information handling systems having power over Ethernet (PoE) compliant devices, said method comprising the steps of communicating with a plurality of PoE compliant devices, each of the plurality of PoE compliant devices being coupled to a one of a plurality of information handling systems; and determining a status of at least one of the plurality of information handling systems with the PoE compliant devices when the at least one of the plurality of information handling systems loses main power.

According to another specific example embodiment of this disclosure, a system for performing management and diagnoses of information handling systems having power over Ethernet (PoE) compliant devices, said system comprising: a plurality of information handling systems, each of the plurality of information handling systems having a PoE compliant device, wherein each of the PoE compliant devices are communicating with other ones of the PoE compliant devices; and at least one of the plurality of information handling systems performing management and diagnoses of the other ones of the plurality of information handling systems when any of the other ones of the plurality of information handling systems loses main power.

According to another specific example embodiment of this disclosure, a system for performing management and diagnoses of information handling systems having power over Ethernet (PoE) compliant devices, said system comprising: a plurality of information handling systems, each of the plurality of information handling systems having a PoE compliant device, wherein each of the PoE compliant devices are communicating with other ones of the PoE compliant devices; and at least one of the plurality of information handling systems performing management and diagnoses of the other ones of the plurality of information handling systems when any of the other ones of the plurality of information handling systems looses main power.

BRIEF DESCRIPTION OF THE DRAWINGS

A more complete understanding of the present disclosure thereof may be acquired by referring to the following description taken in conjunction with the accompanying drawings wherein.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of specific example embodiments of the present invention are schematically illustrated. Like elements in the drawings will be represented by like numbers, and similar elements will be represented by like numbers with a different lower case letter suffix.

Figure 1:
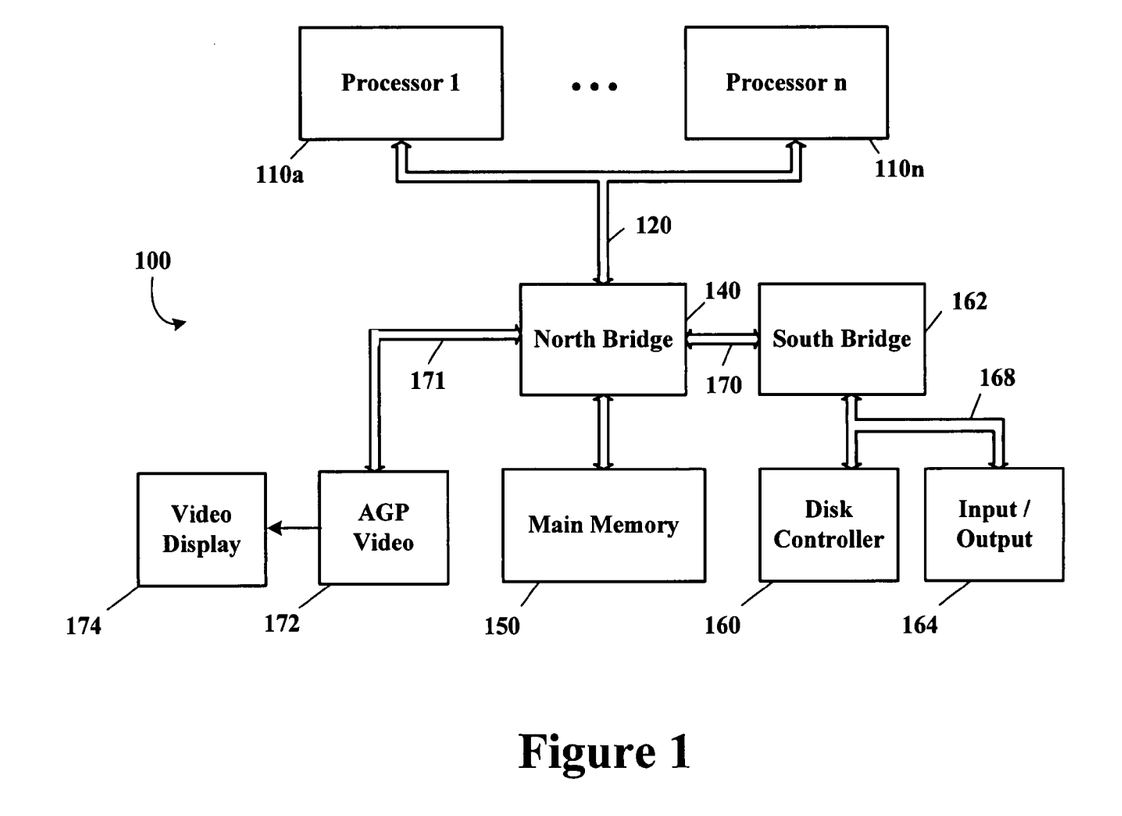
FIG. 1 is a schematic block diagram of an information handling system, according to specific example embodiments of the present disclosure.

Referring to FIG. 1, depicted is an information handling system having electronic components mounted on at least one printed circuit board (PCB) (motherboard) and communicating data and control signals therebetween over signal buses, according to a specific example embodiment of the present disclosure. In one example embodiment, the information handling system is a computer system. The information handling system, generally referenced by the numeral 100, comprises a plurality of physical processors 110, generally represented by processors 110*a*-110*n*, coupled to a host bus(es) 120. A north bridge 140, which may also be referred to as a memory controller hub or a memory controller, is coupled to a main system memory 150. The north bridge 140 is coupled to the plurality of processors 110 via the host bus(es) 120. The north bridge 140 is generally considered an application specific chip set that provides connectivity to various buses, and integrates other system functions such as a memory interface. For example, an Intel® 820E and/or 815E chip set, available from the Intel Corporation of Santa Clara, Calif., provides at least a portion of the north bridge 140. The chip set may also be packaged as an application specific integrated circuit (ASIC). The north bridge 140 typically includes functionality to couple the main system memory 150 to other devices within the information handling system 100. Thus, memory controller functions such as main memory control functions typically reside in the north bridge 140. In addition, the north bridge 140 provides bus control to handle transfers between the host bus 120 and a second bus(es), e.g., PCI bus 170, AGP bus 171 coupled to a video graphics interface 172 which drives a video display 174. A third bus(es) 168 may also comprise other industry standard buses or proprietary buses, e.g., ISA, SCSI, I²C, SPI, USB buses through a south bridge (s) (bus interface) 162. A disk controller 160 and input/output interface(s) 164 may be coupled to the third bus(es) 168. At least one input/output interface 164 may be a PoE compliant device, e.g., Ethernet network interface card (PoE NIC).

Figure 2:
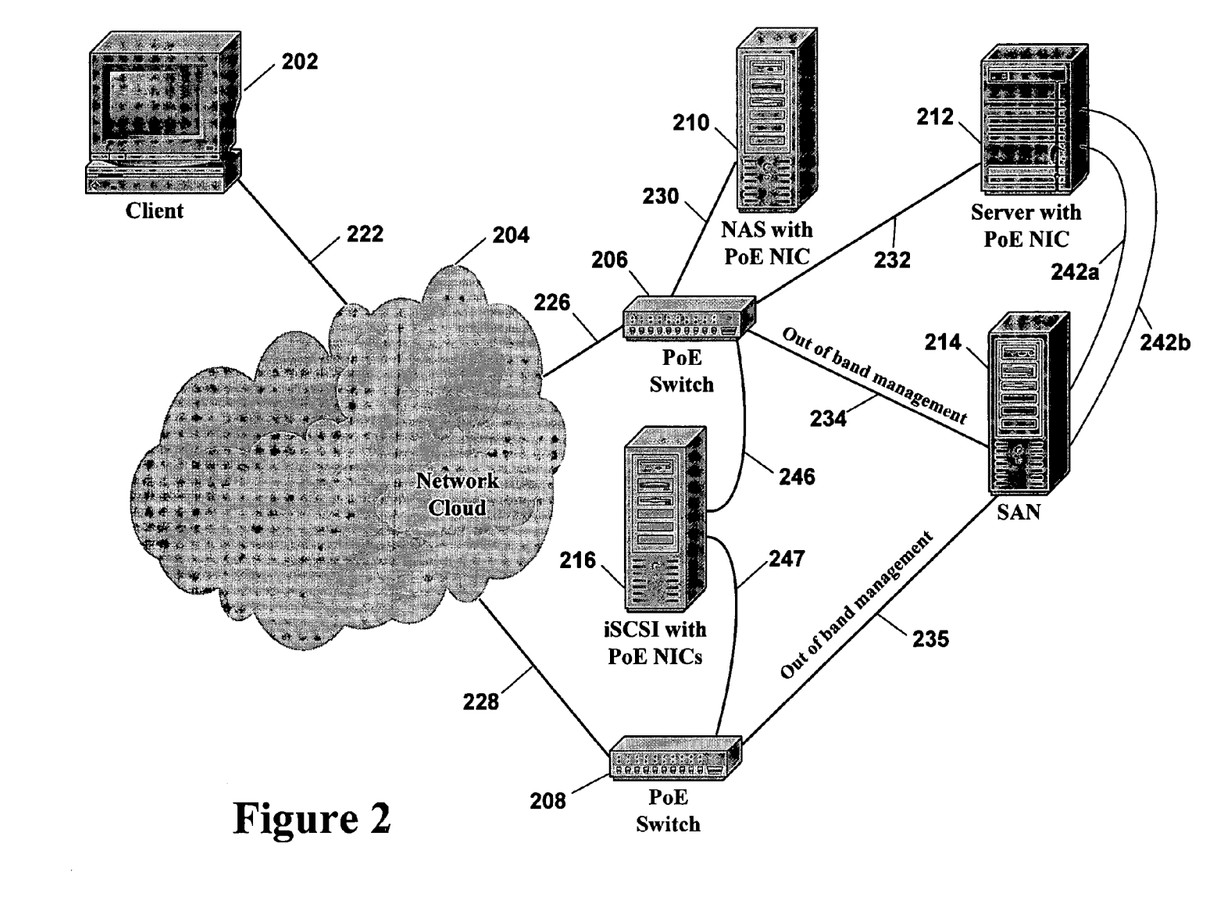
FIG. 2 is a schematic network diagram of a plurality of information handling systems accessible with PoE compliant devices, according to a specific example embodiment of the present disclosure.

Referring to FIG. 2, depicted is a schematic network diagram of a plurality of information handling systems accessible with PoE devices, according to a specific example embodiment of the present disclosure. Shown coupled to a network cloud 204 are a client computer 202, a first PoE switch 206 and a second PoE switch 208. The client computer 202, first PoE switch 206 and second PoE switch 208 may be coupled to the network cloud 204 through serial data portals, e.g., Ethernet portals 222, 226 and 228 respectively. The Ethernet portals 222, 226 and/or 228 may also include (not shown) telephone (DSL), cable, wireless, satellite, etc., interfaces, for example but not limited to, an intranet, extranet, Internet and the like.

The first PoE switch 206 and a second PoE switch 208 may be power over Ethernet (PoE) compliant with the IEEE 802.3af standard and may include power sources for powering other connected PoE compliant devices. Other connected PoE compliant devices may be, for example but not limited to, a network interface card (NIC), an Ethernet hub, an Ethernet router, an DSL modem, a cable modem, wireless, e.g., WIFI, etc.

The network attached storage (NAS) 210 may have a PoE-NIC, a server 212 may have a PoE NIC, and an iSCSI system 216 may have a plurality of PoE NICs. A storage array network (SAN) 214 may be coupled to the server 212 over, for example, Fibre Channel (FC) 242 (dual FC connections 242a and 242b are shown). The SAN 214 may communicate with the first PoE switch 206 and the second PoE switch 208 over Ethernet connections 234 and 235, respectively (e.g., over out of band management channels). The iSCSI system 216 may communicate with the first PoE switch 206 and the second PoE switch 208 over Ethernet connections 246 and 247, respectively. The NAS 210 may communicate with the first PoE switch 206 over Ethernet connection 230 and/or the second PoE switch 208 (not shown). The server 212 may communicate with the first PoE switch 206 over Ethernet connection 232 and/or the second PoE switch 208 (not shown).

A systems user and/or administrator my use, for example but is not limited to, the client computer 202 to check on the status of any or all of the NAS 210, server 212, SAN 214, and/or iSCSI system 216 through the first PoE switch 206 and/or the second PoE switch. The status of any of the aforementioned devices may be obtained by using management applications such as, for example but not limited to, HP OpenView®, IT Assistant, NaviSphere®, etc.

If AC mains power should fail on any one or more of the NAS 210, server 212, SAN 214, and/or iSCSI system 216 then limited management application communications is still possible through the associated PoE compliant NICs coupled to the first PoE switch 206 and/or the second PoE switch 208.

Failover may be supported in the iSCSI system 216 since both associated NICs may be PoE compliant and management status thereby stays functional (e.g., stays alive). This stay alive ability of the PoE compliant NICs in the iSCSI system 216 may enable the iSCSI system 216 as a target to provide information (respond to an iSCSI initiator request) as to why it cannot fully respond to an initiator data access and/or storage request. This response capability may enable the requesting iSCSI initiator (e.g., client computer 202) to perform a graceful disconnect instead of just assuming a lost connection/communication with the target iSCSI system 216. Disks of the iSCSI system 216 may not be operational if AC mains power is lost, but valid SCSI responses may still come from the target iSCSI system 216 via the associated PoE NICs.

The SAN 214 may have multiple management modules that may be routed to separate PoE compliant switches (e.g., first PoE switch 206 and/or second PoE switch 208) thereby keeping the out of band management operational in the event of an AC mains power failure even though the storage disks therein may not be operational.

Figure 3:
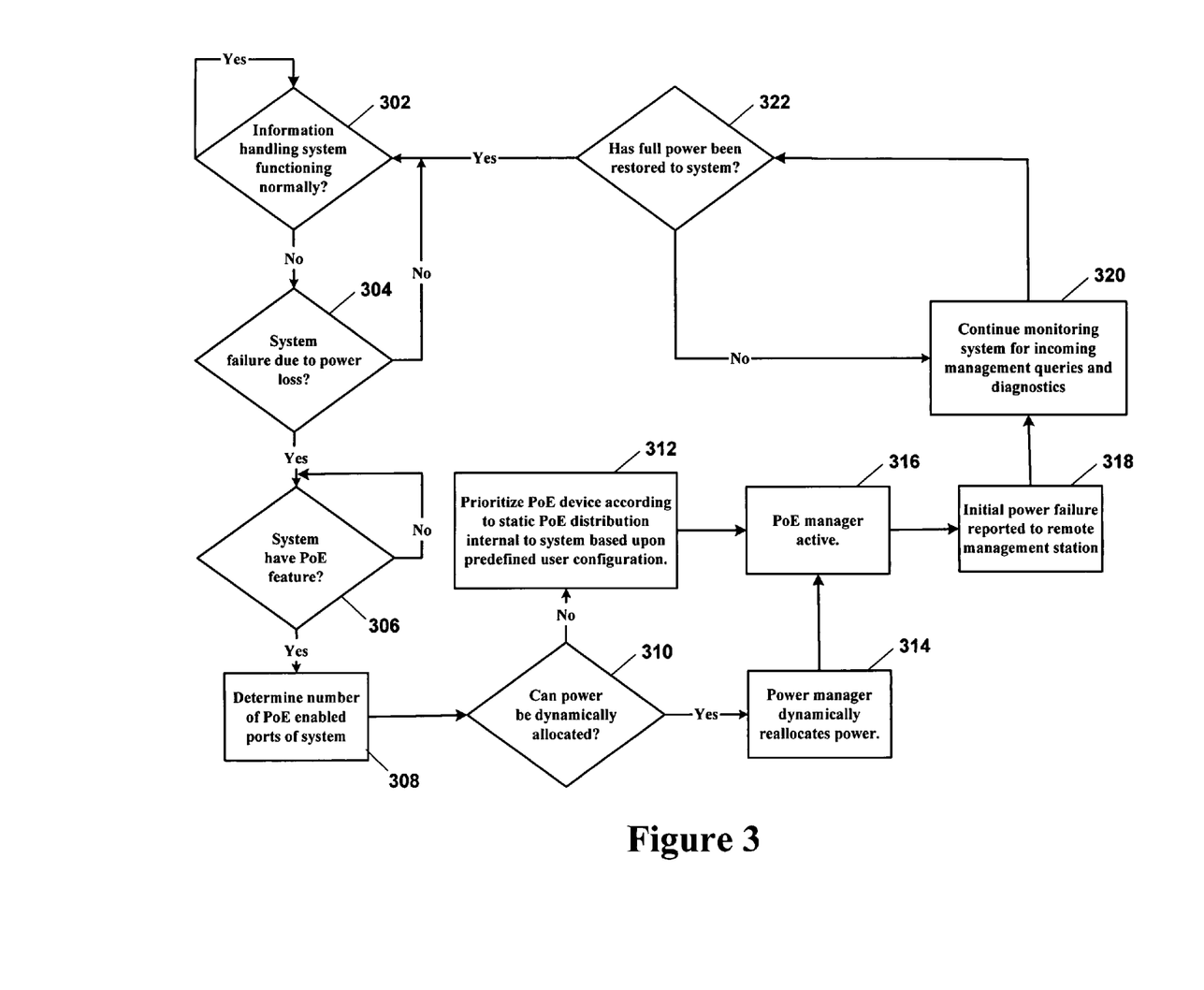
FIG. 3 is a flow diagram for power management of a plurality of PoE compliant devices, according to a specific example embodiment of the present disclosure.

Referring now to FIG. 3, depicted is a flow diagram for power management of a plurality of PoE compliant devices, according to a specific example embodiment of the present disclosure. Step 302 determines whether the information handling system is functioning normally. When the information handling system is not functioning normally, step 304 determines whether the non-normal functional occurrence may be due to a power loss. If a power loss is determined in step 304, then step 306 determines whether the information handling system has at least one PoE compliant interface device. If at least one PoE compliant interface device is determined in step 304, then the number of PoE enabled devices, e.g., ports, of the information handling system are determined in step 308. Step 310 determines whether power to any of the PoE enabled devices may be dynamically allocated. If dynamic power allocation to a PoE enabled device cannot be made then in step 312 prioritization of power to the PoE device is made according to a static PoE distribution internal to the information handling system based upon a predefined user configuration. If power to a PoE device may be dynamically allocated then in step 314 the power manager may dynamically reallocated power to each such PoE device. The power manager may manage power based upon the following criteria: PoE device subcomponent prioritization, and/or power consumption/utilization. Step 316 indicates that management for the PoE device is active and step 318 may report an initial power failure to a remote information handling system management station. In step 320, the information handling system continues to be monitored for incoming management queries and diagnostics of the system power condition until step 322 determines that full system power has been restored.

Figure 4:
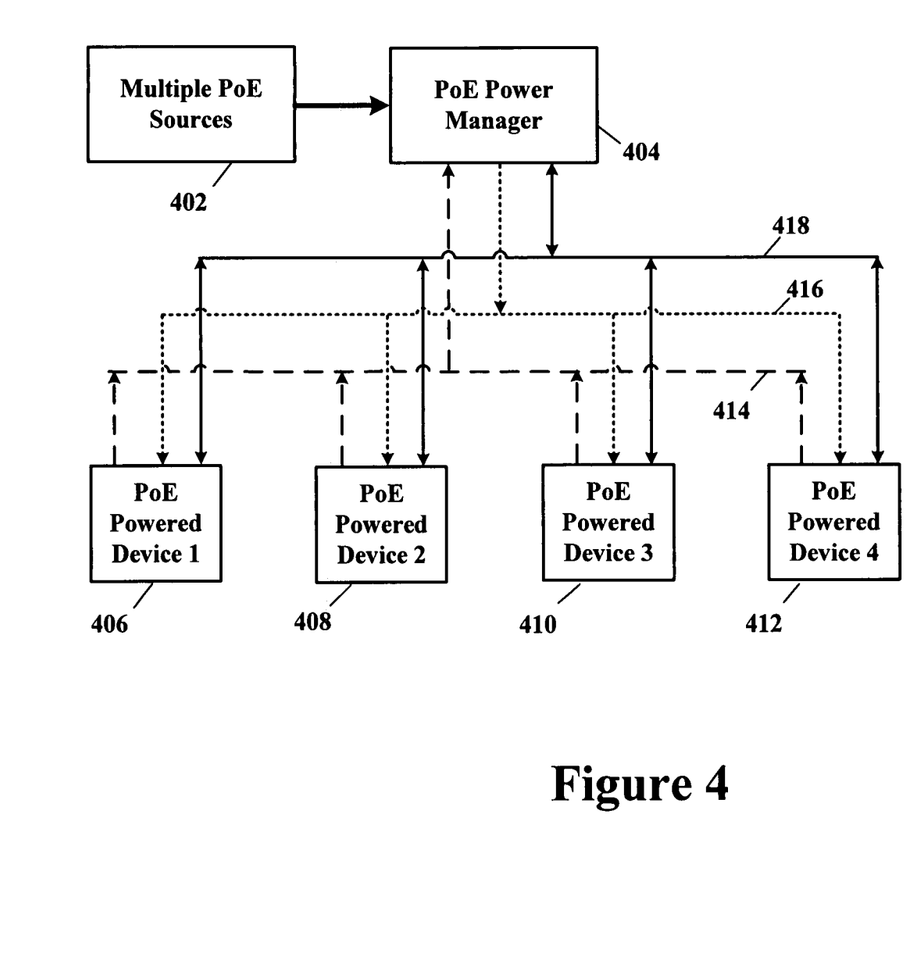
FIG. 4 is a schematic block diagram of a plurality of PoE compliant devices coupled to a PoE power manager, according to a specific example embodiment of the present disclosure.

Referring now to FIG. 4, depicted is a schematic block diagram of a plurality of PoE compliant devices coupled to a PoE power manager, according to a specific example embodiment of the present disclosure. Multiple PoE sources, generally represented by the numeral 402, may be for example but not limited to, network interface controllers (NICs) having a PoE compliant power source(s). The multiple PoE sources 402 may be coupled to a PoE power manager 404, and the PoE power manager 404 may be coupled to a plurality of PoE powered devices, e.g., PoE devices 406, 408, 410 and 412. The PoE devices 406-412 may be controlled over a bidirectional dynamic allocation bus 418, or by sending a static allocation device request over bus 414 and a static allocation reply from the PoE power manager 404 over bus 416.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for performing management and diagnoses of information handling systems having power over Ethernet (PoE) compliant devices, said method comprising the steps of:
   communicating with a plurality of PoE compliant devices, each of the plurality of PoE compliant devices being coupled to a one of a plurality of information handling systems;
   determining a status of at least one of the plurality of information handling systems with the PoE compliant devices, wherein the step of determining is performed after the at least one of the plurality of information handling systems loses main power; and
   remotely controlling the at least one of the plurality of information handling systems with the PoE compliant devices, wherein the step of remotely controlling is performed when the at least one of the plurality of information handling systems loses main power, wherein remotely controlling includes:
      in response to a failed communication caused by the at least one of the plurality of information handling systems losing main power,
      keeping out of band management operational by routing one or more management modules to separate PoE compliant devices when the at least one of the plurality of information handling systems loses main power, wherein the one or more management modules manage the operation of one or more of the plurality of information handling systems;
      detecting whether a graceful shutdown occurred at the at least one of the plurality of information handling systems, and
      determining whether to perform a disconnect of the at least one of the plurality of information handling systems from a network.

2. The method according to claim 1, wherein at least one of the plurality of PoE complaint devices is a network interface card (NIC).

3. The method according to claim 1, wherein at least one of the plurality of PoE complaint devices is an Ethernet switch.

4. The method according to claim 1, wherein at least one of the plurality of PoE compliant devices is an Ethernet hub.

5. The method according to claim 1, wherein at least one of the plurality of PoE compliant devices is an Ethernet router.

6. The method according to claim 1, wherein at least one of the plurality of PoE compliant devices is a wireless device.

7. The method according to claim 1, wherein at least one of the plurality of information handling systems is a client computer.

8. The method according to claim 1, wherein at least one of the plurality of information handling systems is a network attached storage (NAS) device.

9. The method according to claim 1, wherein at least one of the plurality of information handling systems is a server.

10. The method according to claim 1, wherein at least one of the plurality of information handling systems is a storage array network (SAN).

11. The method according to claim 1, wherein at least one of the plurality of information handling systems is an Internet small computer system interface (iSCSI) device.

12. The method according to claim 10, wherein the storage array network (SAN) is coupled to at least one of the PoE compliant devices over an out of band management channel.

13. The method according to claim 1, wherein the step of determining the status of the at least one of the plurality of information handling systems comprises using a management application running on a client computer.

14. The method according to claim 1, wherein the plurality of PoE compliant devices meet requirements of IEEE 802.3af.

15. The method according to claim 1, wherein the status is a power failure status.

16. The method according to claim 15, further comprising the step of alerting an administrator when the power failure status is determined.

17. A system for performing management and diagnoses of information handling systems having power over Ethernet (PoE) compliant devices, said system comprising:
   a plurality of information handling systems, each of the plurality of information handling systems having a PoE compliant device, wherein each of the PoE compliant devices are communicating with other ones of the PoE compliant devices; and
   wherein at least one of the plurality of information handling systems, after any of the other ones of the plurality of information handling systems loses main power, performs management and diagnoses of the other ones of the plurality of information handling systems, and remotely controls the other ones of the plurality of information handling systems with PoE compliant devices, wherein remotely controlling includes:
      in response to a failed communication caused by the at least one of the plurality of information handling systems losing main power,
      keeping out of band management operational by routing one or more management modules to separate PoE compliant devices when the at least one of the plurality of information handling systems loses main power, wherein the one or more management modules manage the operation of one or more of the plurality of information handling systems;
      detecting whether a graceful shutdown occurred at the at least one of the plurality of information handling systems, and
      determining whether to perform a disconnect of the other ones of the plurality of information handling systems from a network.

18. The system according to claim 17, wherein at least one of the plurality of information handling systems is selected from the group consisting of a client computer, a network attached storage (NAS) device, a server, a storage array network (SAN), and an Internet small computer system interface (iSCSI) device.

19. The system according to claim 17, wherein at least one of the PoE complaint devices is selected from the group consisting of a network interface card (NIC), an Ethernet switch, an Ethernet hub, an Ethernet router, and a wireless device.

20. The system according to claim 17, wherein the at least one of the plurality of information handling systems performing management and diagnoses of the other ones of the plurality of information handling systems alerts a systems administrator when a predefined event occurs.

21. The system according to claim 20, wherein the predefined event is a power failure.

22. The method according to claim 1, further comprising the steps of:
- determining whether the information handling system is functioning normally;
- if the information handling system is not functioning normally then determining whether non-normal functioning is due to a power loss;
- determining whether the information handling system has a PoE feature;
- determining a number of the plurality of PoE compliant devices;
- determining whether power can be dynamically allocated to the plurality of PoE compliant devices, wherein
  - if not then prioritize each one of the plurality of PoE compliant devices according to a static PoE distribution, and
  - if so then dynamically reallocate power to the plurality of PoE compliant devices;
- activating PoE management;
- report the power loss to a remote management station;
- continue monitoring the information handling system for incoming management queries and diagnostics; and
- determining whether the power loss is over.

23. The method according to claim 22, wherein the static PoE distribution is based upon a predefined user configuration.

24. The system according to claim 17, further comprising:
- means for determining whether the information handling system is functioning normally, where if the information handling system is not functioning normally then means for determining whether non-normal functioning is due to a power loss;
- means for determining whether the information handling system has a PoE feature;
- means for determining a number of the plurality of PoE compliant devices;
- means for determining whether power can be dynamically allocated to the plurality of PoE compliant devices, wherein if not then means for prioritize each one of the plurality of PoE compliant devices according to a static PoE distribution, and if so then means for dynamically reallocate power to the plurality of PoE compliant devices;
- a PoE management that is active;
- a remote management station adapted to receive a report of power loss;
- means for continuous monitoring of the information handling system for incoming management queries and diagnostics; and
- a signal indicating that the power loss is over.

25. The system according to claim 24, wherein the static PoE distribution is based upon a predefined user configuration.

* * * * *